(12) United States Patent
Guo et al.

(10) Patent No.: US 9,075,660 B2
(45) Date of Patent: Jul. 7, 2015

(54) APPARATUS AND METHOD FOR PROVIDING SERVICE AVAILABILITY TO A USER VIA SELECTION OF DATA CENTERS FOR THE USER

(75) Inventors: Yang Guo, Princeton Junction, NJ (US); Eric J. Bauer, Freehold, NJ (US); Randee S. Adams, Naperville, IL (US); Volker Hilt, Waiblingen Hegnach (DE)

(73) Assignee: Alcatel Lucent, Boulogne-Billancourt (FR)

(*) Notice: Subject to any disclaimer, the term of this patent is extended or adjusted under 35 U.S.C. 154(b) by 725 days.

(21) Appl. No.: 13/433,413

(22) Filed: Mar. 29, 2012

(65) Prior Publication Data

US 2013/0262681 A1    Oct. 3, 2013

(51) Int. Cl.
*G06F 15/173* (2006.01)
*G06F 9/50* (2006.01)
*H04L 29/08* (2006.01)

(52) U.S. Cl.
CPC .......... *G06F 9/5027* (2013.01); *H04L 29/0818* (2013.01); *H04L 29/08225* (2013.01)

(58) Field of Classification Search
CPC ...... G06F 15/161; G06F 15/16; G06F 15/173
USPC ................................................ 709/223, 226
See application file for complete search history.

(56) References Cited

U.S. PATENT DOCUMENTS

2002/0038360 A1 * 3/2002 Andrews et al. ............ 709/223

OTHER PUBLICATIONS

International Search Report and Written Opinion for International Patent Application Serial No. PCT/US2013/027899, mailed Nov. 21, 2013, consists of 14 unnumbered pages.
Hao Fang, et al., "Enhancing Dynamic Cloud-Based Services Using Network Virtualization," *Computer Communication Review*, ACM New York, NY, vol. 40, No. 1, Jan. 1, 2010, pp. 67-74, XP002562789, ISSN:0146-4833, DOI: 10.1145/1592648.1592655.
"Application Fluency in the Data Center A Strategic Choice for the Data Center Network," Jan. 1, 2011, pp. 1-10, XP055086091, http://www.bradreese.com/blog/alcatel-lucent-application-fluent-data-center.pdf.

* cited by examiner

*Primary Examiner* — Glenford Madamba
(74) *Attorney, Agent, or Firm* — Wall & Tong, LLP

(57) ABSTRACT

A capability is provided for improving service availability experienced by a user requesting access to a service via a user device, where the service has multiple service instances available from multiple data centers. A set of servicing data centers is selected for the user device. The set of servicing data centers is selected from a set of candidate data centers. The set of servicing data centers is selected from the set of candidate data centers in a manner for maximizing the independence/orthogonality of the network paths between the user device and the servicing data centers. The set of servicing data centers includes two or more of the candidate data centers from which the user device may access the service, thereby providing the user device with a primary service instance and one or more backup service instances which may be used to access the service.

20 Claims, 4 Drawing Sheets

APPARATUS AND METHOD FOR PROVIDING SERVICE AVAILABILITY TO A USER VIA SELECTION OF DATA CENTERS FOR THE USER

TECHNICAL FIELD

This case relates generally to computing and, more specifically but not exclusively, to distributed computing.

BACKGROUND

The overall cloud infrastructure includes data centers supporting cloud services and communication networks via which end users may communicate with the data centers for accessing and using the cloud services. Since an end user relies upon the reliability of the communication networks in order to access a cloud service, one or more network outage conditions in one or more of the communication networks may result in a situation in which one or more of the data centers becomes unreachable to the end user and, thus, the cloud service is unavailable to the end user.

SUMMARY

Various deficiencies in the prior art are addressed by embodiments for supporting distributed computing.

In one embodiment, an apparatus includes a processor and a memory communicatively connected to the processor. The processor is configured to receive, from a user device, a request for a service having a plurality of service instances hosted at a plurality of candidate data centers. The processor is configured to select a set of servicing data centers for the user device, from the plurality of candidate data centers, based on network path information associated with a respective plurality of network paths between the user device the respective candidate data centers.

In one embodiment, a method uses at least one processor to perform steps of receiving, from a user device, a request for a service having a plurality of service instances hosted at a plurality of candidate data centers, and selecting a set of servicing data centers for the user device, from the plurality of candidate data centers, based on network path information associated with a respective plurality of network paths between the user device the respective candidate data centers.

In one embodiment, an apparatus includes a processor and a memory communicatively connected to the processor. The processor is configured to propagate a request for a service from a user device toward a network element. The processor is configured to receive, from the network element, an indication of a plurality of servicing data centers, the servicing data centers selected by the network element from among a plurality of candidate data centers hosting a plurality of services instances of the requested service, the servicing data centers selected by the network element based on network path information associated with a plurality of network paths between the user device and the respective plurality of candidate data centers.

In one embodiment, a method uses at least one processor to perform steps of propagating a request for a service from a user device toward a network element, and receiving, from the network element, an indication of a plurality of servicing data centers, the servicing data centers selected by the network element from among a plurality of candidate data centers hosting a plurality of services instances of the requested service, the servicing data centers selected by the network element based on network path information associated with a plurality of network paths between the user device and the respective plurality of candidate data centers.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, distributed computing related capabilities are depicted and described herein, although various other capabilities also may be presented herein.

In at least some embodiments, for a service having multiple service instances available from multiple available data centers accessible via wide area data communication networks, a set of servicing data centers is selected for a user device in response to a request from the user device to access the service. The set of servicing data centers is selected from a set of candidate data centers. The set of servicing data centers is selected from the set of candidate data centers in a manner for maximizing the independence/orthogonality of the network paths between the user device and the servicing data centers (e.g., to minimize commonality of the network components of which the network paths are composed and, thus, eliminate common points of failure which may impact the ability of the user device to access the service). The set of servicing data centers includes two or more of the candidate data centers from which the user device may access the service, thereby providing the user device with a primary service instance and one or more backup service instances which may be used to access the service. In this manner, the availability and reliability of the service to the user of the user device is improved (and, in at least some cases, maximized). In at least some embodiments, network failure may be virtually eliminated as a cause for service unavailability or unreliability.

Figure 1:
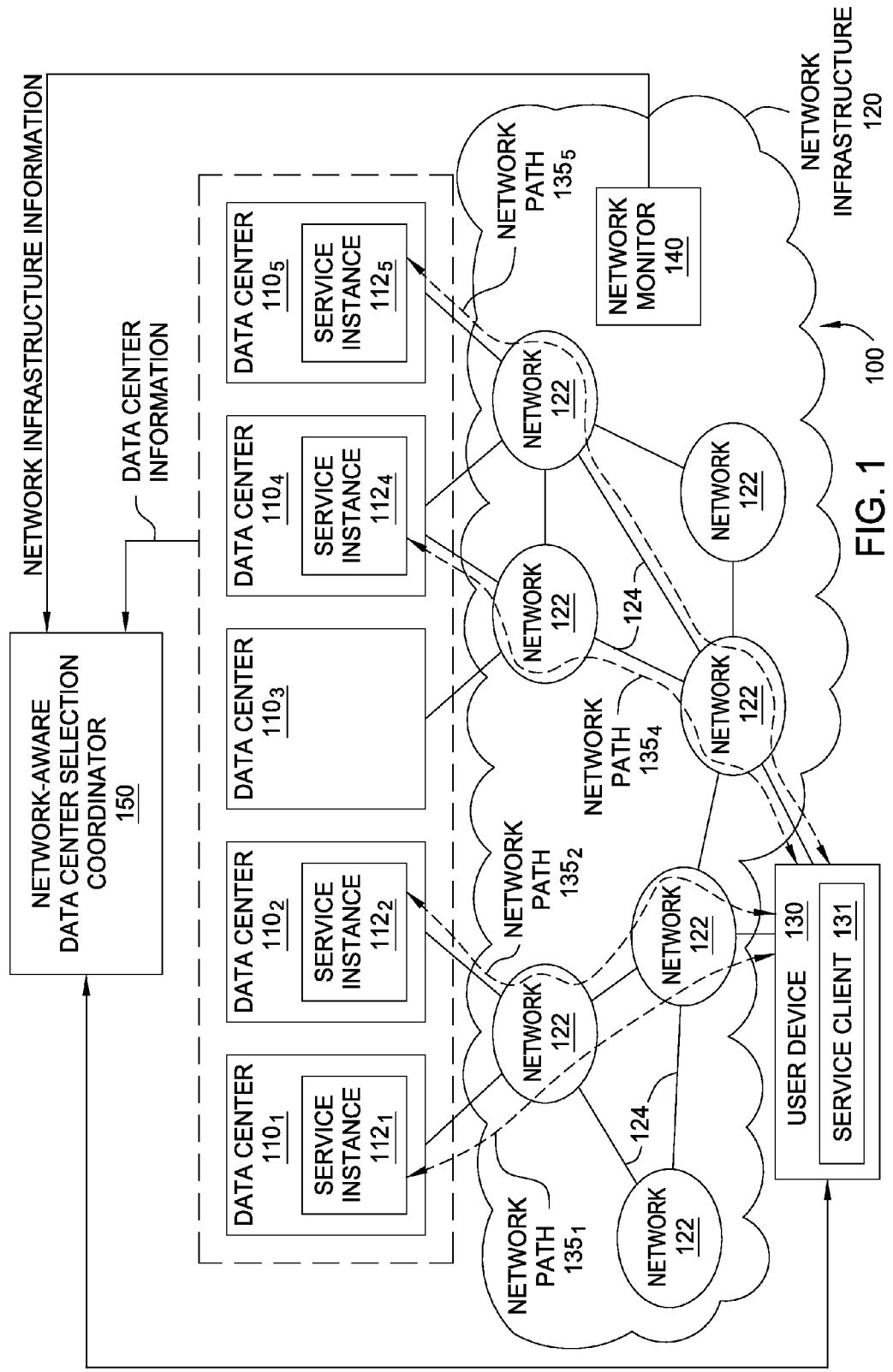
FIG. 1 depicts a high-level block diagram of an exemplary system configured to support services for a user.

FIG. 1 depicts a high-level block diagram of an exemplary system configured to support services for a user.

As depicted in FIG. 1, exemplary system 100 includes a plurality of data centers $110_1$-$110_5$ (collectively, data centers 110), network infrastructure 120, a user device 130, a network monitor 140, and a network-aware data center selection coordinator 150.

The data centers 110 each may support one or more services. The services may include any suitable types of services which may be hosted by a data center and provided to an end user (e.g., applications, cloud computing services, and the like). In general, a service that is available from multiple data centers may be implemented using multiple service instances of the service hosted in the multiple data centers, respectively. For purposes of clarity, only a single service 112 is depicted and described with respect to system 100 of FIG. 1. As depicted in FIG. 1, the service 112 is available from data center $110_1$ (as service instance $112_1$), data center $110_2$ (as service instance $112_2$), data center $110_4$ (as service instance $112_4$), and data center $110_5$ (as service instance $112_5$), but not from data center $110_3$ (and, thus, an associated service instance is not hosted in data center $110_3$). The service instances $112_1$, $112_2$, $112_4$, and $112_5$ of data centers $110_1$, $110_2$, $110_4$, and $110_5$, respectively, may be referred to collectively as service instances 112. The service instances 112 may have different addresses (e.g., Internet Protocol (IP) addresses or any other suitable type of addresses) associated therewith (e.g., such as where a Domain Name Server (DNS) resolves a service identifier of a service into multiple IP addresses which may be used to contact service instances of that service). The data centers 110 are geographically distributed (e.g., where geo-redundancy is typically used to move data centers physically closer to geographically dispersed users in order to shorten service latency and improve quality of experience and/or to provide business continuity/disaster recovery capabilities), although it will be appreciated that not all of the data centers 110 need to be or will be geographically remote from each other. The data centers 110 may be configured to provide data center information to network-aware data center selection coordinator 150 for use by network-aware data center selection coordinator 150 in performing various functions described herein. Although the data centers 110 are depicted as being associated via a dotted-line box, it is noted that this dotted-line box is merely used for purposes of simplicity in showing that any of the data centers 110 may provide data center information to network-aware data center selection coordinator 150. Although primarily depicted and described with respect to use of a specific number of data centers 110 (illustratively, five data centers 110), it will be appreciated that fewer or more data centers 110 may be deployed (and, similarly, that fewer or more data centers 110 may be considered as part of the set of available data centers 110).

The network infrastructure 120 is configured to support communication between the datacenters 110 and user devices (including, illustratively, user device 130). The network infrastructure 120 includes a plurality of communication networks 122 (collectively, communication networks 122) interconnected via a plurality of communication paths 124 (collectively, communication paths 124). It will be appreciated that each of the communication networks 122 includes various network elements (e.g., routers, switches, controllers, and the like) and communication links. It also will be appreciated that each of the communication paths 124 may represent communication links (and, in many cases, associated network elements) forming communication paths between the communication networks 122. The networks, communication paths, network elements, communication links, and other components of the underlying network infrastructure may be referred to herein as network components. In general, a network path for a given data center 110 is a path between the datacenter 110 and the user device 130 and, thus, is considered to include the network components included along the path between the data center 110 and the user device 130 (e.g., some or all of the network components of which the path is composed). Although primarily depicted and described with respect to use of a specific numbers and arrangements of networks 122 and communication paths 124, it is noted that fewer and/or more networks 122 and communication paths 124 may be used and, similarly, that the networks 122 and communication paths 124 may be arranged using any other suitable configuration.

The user device 130 is a user device configured to use one or more services which may be hosted at the data centers 110 (e.g., service 112). The user device 130 may include one or more clients configured to use the one or more services (illustratively, a service client 131 configured to interact with any of the service instances 112 of service 112). The service client 131 may be a single-flow client configured to interact with different ones of the service instances 112 sequentially or a multi-flow client configured to interact with multiple service instances 112 sequentially and/or contemporaneously. This interaction with the service instances 112 may include sending service requests to access the service 112, receiving service responses in response to service requests to access the service 112, using the service 112, and the like. The user device 130 may be any type of user device which may be configured to support such functions (e.g., a desktop computer, a laptop computer, a tablet computer, a smart phone, and the like).

As depicted in FIG. 1, the data centers 110, network infrastructure 120, and user device 130 are arranged such that different network paths $135_1$, $135_2$, $135_4$, and $135_5$ (collectively, network paths 135) are used when user device 130 accesses service 112 using service instances $112_1$, $112_2$, $112_4$, and $112_5$ of data centers $110_1$, $110_2$, $110_4$, and $110_5$, respectively. The data centers 110, network infrastructure 120, and user device 130 are arranged such that some network paths 135 between the data centers 110 and the user device 130 share relatively significant portions of the network infrastructure 120 while other network paths 135 between the data centers 110 and the user device 130 share relatively insignificant portions of the network infrastructure 120 (or do not share any portions of the network infrastructure 120). For example, respective network paths $135_1$ and $135_2$ between user device 130 and data centers $110_1$ and $110_2$ share more common portions of the network infrastructure 120 than respective network paths $135_1$ and $135_4$ between user device 130 and data centers $110_1$ and $110_3$ (or respective network paths $135_1$ and $135_5$ between user device 130 and data centers $110_1$ and $110_5$). This illustrates the potential risks where user device 130, when attempting to use service 112, elects to use data center $110_1$ as its primary serving data center and to use data center $110_2$ as its backup serving data center (namely, if any of the network components common to the respective network paths $135_1$ and $135_2$ between user device 130 and data centers $110_1$ and $110_2$ fails, user device 130 will not be able to reach its primary data center $110_1$ or its backup data center $110_2$ and, thus, will not be able to use the service). It may be seen that selection of one of the other data centers (illustratively, data center $110_4$ or $110_5$) as the backup data center for the service 112 for user device 130 eliminates the single point of failure that would result from selection of data centers $110_1$ and $110_2$ as discussed above, because the network path $135_1$ between the user device 130 and the primary data center (data center $110_1$) and the network path (network path $135_4$ or network path $135_5$) between the user device 130 and the backup data center (data center $110_4$ or $110_5$) do not share any common network components (i.e., a single failure within network infrastructure 120 cannot prevent access by the user device 130 to both the primary and backup service instances 112 and, thus, cannot prevent the user device 130 from accessing service 112). Thus, selection of data center $110_4$ or $110_5$ (instead of selection of data center $110_2$) as the backup data center for service 112 for user device 130 improves the availability and reliability of the service 112 for the user device 130.

The network monitor 140 is configured to collect network infrastructure information for network infrastructure 120.

The network monitor 140 may collect the network infrastructure information via active monitoring of the network infrastructure 120 (where communications between the network monitor 140 and communication networks 122 of network infrastructure 120 for purposes of collecting network infrastructure information is omitted for purposes of clarity), from one or more management systems (omitted for purposes of clarity) associated with the network infrastructure 120, and the like, as well as various combinations thereof. The network infrastructure information may include network topology information (e.g., network connectivity information for connectivity between the communication networks 122, network connectivity information between network elements within the communication networks 122, and the like), status information (e.g., status associated with network components of the network infrastructure 120, status associated with groups of network components of the network infrastructure 120, and so forth), and the like, as well as various combinations thereof. The network monitor 140 provides the collected network infrastructure information to the network-aware data center selection coordinator 150 for use by the network-aware data center selection coordinator 150 in intelligently selecting servicing data centers for user devices. Although primarily depicted and described with respect to an embodiment in which network monitor 140 is included within the network infrastructure 120, it is noted that network monitor 140 alternatively may be implemented outside of network infrastructure 120. Although primarily depicted and described with respect to use of a single network monitor 140, it is noted that any suitable number of network monitors may be used to provide network infrastructure information for network infrastructure 120 to network-aware data center selection coordinator 150.

The network-aware data center selection coordinator 150 is configured to intelligently select multiple service instances 112 of a service, hosted in multiple data centers 110, for user device 130 in response to a service request from user device 130 for that service.

The network-aware data center selection coordinator 150 receives a service request from the user device 130, where the service request identifies a service requested by the user device 130.

The network-aware data center selection coordinator 150 determines a set of candidate data centers 110 for the user device 130. The set of candidate data centers 110 includes any of the available data centers 110 having a service instance 112 for the service identified in the service request, which may include all of the available data centers 110 of the system 100 or a subset of the available data centers 110 of the system 100.

In one embodiment, the network-aware data center selection coordinator 150 determines the set of candidate data centers 110 by identifying the service 112 requested by the user device 130 and identifying each of the available data centers 110 hosting a service instance 112 of the requested service 112. In one embodiment, the network-aware data center selection coordinator 150 determines the set of candidate data centers 110 by identifying the service 112 requested by the user device 130, identifying each of the available data centers 110 hosting a service instance 112 of the requested service 112, and then further selecting some or all of the available data centers 110 hosting a service instance 112 of the requested service 112 to be part of the set of candidate data centers 110 based on evaluation information.

In one embodiment, network-aware data center selection coordinator 150 identifies each of the available data centers 110 hosting a service instance 112 of the requested service 112 using data center information available to network-aware data center selection coordinator 150. The data center information includes a mapping of service instances 112 of the service to the data centers 110 in which the service instances 112 are hosted (and which also may include similar mappings for service instances of other services). The network-aware data center selection coordinator 150 may select the set of candidate data centers 110 by using an identifier of the requested service (determined from the service request) to search the mapping of the service instances to data centers and identify therefrom which of the available data centers 110 have respective service instances 112 for the service. It is noted that the mapping may be specified in any suitable manner (e.g., as per data centers lists of the service(s) hosted by the data centers 110, as per service lists of data centers 110 hosting the services, and the like, as well as various combinations thereof).

In one embodiment, in which network-aware data center selection coordinator 150 further selects some or all of the available data centers 110 hosting a service instance 112 of the requested service 112 to be part of the set of candidate data centers 110 based on evaluation information, the evaluation information may include data center information associated with the available data centers 110 identified as hosting the requested service 112, network infrastructure information associated with network infrastructure 120, other information, and the like, as well as various combinations thereof. For example, the evaluation information may include geographic locations of the available data centers 110 identified as hosting the requested service 112, geographic locations of the available data centers 110 identified as hosting the requested service 112 relative to each other, geographic locations of the available data centers 110 identified as hosting the requested service 112 relative to the user device 130, data center loading associated with the available data centers 110 identified as hosting the requested service 112, network status information associated with network infrastructure 120 (e.g., network congestion information, network delay information, network utilization information, and the like), data center operator preferences of an operator of the available data centers 110 identified as hosting the requested service 112, network operator preferences of at least one network operator of at least one network 122 of the network infrastructure 120, user preferences of a user of the user device 130, and the like, as well as various combinations thereof.

In such embodiments, the network-aware data center selection coordinator 150 may access the associated information (e.g., data center information, evaluation information, and the like) locally (e.g., in a memory of network-aware data center selection coordinator 150) and/or remotely (e.g., in the case of data center information from the data centers 110 and/or from one or more systems storing data center information for the data centers 110, in the case of network infrastructure information from the network monitor 140 and/or from one or more systems storing network infrastructure information for network infrastructure 120, in the case of preference information from one or more profile databases and/or other suitable sources of such information, and the like, as well as various combinations thereof).

In one embodiment, the network-aware data center selection coordinator 150 specifies the candidate data centers 110 using a priority ordering of the candidate data centers 110. The priority ordering of the candidate data centers 110 may be based on prioritization of the candidate data centers 110 prior to the network-aware data center selection coordinator 150 determining the set of candidate data centers 110 (e.g., where prioritization may be assigned by network-aware data center selection coordinator 150 and/or a device/entity other than network-aware data center selection coordinator 150). The priority ordering of the candidate data centers 110 may be determined based on prioritization of the candidate data centers 110 that is performed after the network-aware data center selection coordinator 150 determines the set of candidate data centers 110 (e.g., again, where prioritization may be assigned by network-aware data center selection coordinator 150 and/or a device/entity other than network-aware data center selection coordinator 150). In such embodiments, the priority ordering of the candidate data centers 110 may be based on at least one of geographic locations of the data centers 110, geographic locations of the data centers 110 relative to each other, geographic locations of the data centers 110 relative to the user device 130, data center loading associated with the data centers 110, network status information associated with network infrastructure 120 (e.g., network congestion information, network delay information, network utilization information, and the like), data center operator preferences of an operator of the candidate data centers 110, network operator preferences of at least one network operator of at least one network 122 of network infrastructure 120, user preferences of a user of the user device 130, and the like, as well as various combinations thereof.

The network-aware data center selection coordinator 150 intelligently selects a set of servicing data centers 110 for the user device 130. The network-aware data center selection coordinator 150 selects the set of servicing data centers 110 for the user device 130 from the set of candidate data centers 110.

The network-aware data center selection coordinator 150 selects the set of servicing data centers 110 based on network path information associated with the network paths 135 between the user device 130 and the candidate data centers 110, respectively. The network-aware data center selection coordinator 150 may select the set of servicing data centers 110 based on expected physical packet routing associated with the network paths 135 between the user device 130 and the candidate data centers 110, respectively. The network-aware data center selection coordinator 150 may select the set of servicing data centers 110 by selecting ones of the candidate data centers 110 such that the network paths 135 between the user device 130 and the selected ones of the candidate data centers 110 are partially or fully independent/orthogonal (e.g., fully independent, as independent as possible, independent within a particular threshold of independence, and the like) in terms of commonality of the underlying network components of which the network paths 135 are composed. The network-aware data center selection coordinator 150 may select the set of servicing data centers 110 in a manner for reducing (and, in at least some cases, minimizing) the number of network components of the network infrastructure 120 that are common to the networks paths 135 from the user device 130 to the servicing data centers 110, thereby reducing (and, in some cases, minimizing) the risk and impact of particular network failures on service availability and reliability. The network-aware data center selection coordinator 150 may select the set of servicing data centers 110 in a manner for reducing (and, in at least some cases, minimizing) common/shared single points of failure in the networks paths 135 from the user device 130 to the servicing data centers 110, thereby reducing (and, in some cases, minimizing) the risk and impact of single network failures on service availability and reliability. In at least some such embodiments, the network-aware data center selection coordinator 150 may select the set of servicing data centers 110 by (1) for each of the candidate data centers 110, determining the network path 135 from the user device 130 to the candidate data center 110, (2) for each of the network paths 135, determining network path information identifying the network components (e.g., routers, switches, communication links, and the like) of which the network path 135 is composed, and (3) analyzing the network path information of the network paths 135 associated with the candidate data centers 110 for selecting ones of the candidate data centers 110 as the servicing data centers 110. As noted above, analysis of the network path information of the network paths 135 may be performed in a manner for identifying ones of the candidate data centers 110 for which associated network paths 135 are most independent/orthogonal with respect to commonality of network components of the network paths, in a manner for reducing or even minimizing the number of network components of the network infrastructure 120 that are common to the networks paths 135 from the user device 130 to the ones of the candidate data centers 110 selected as the servicing data centers 110, and the like. The network-aware data center selection coordinator 150 selects the set of servicing data centers 110 based on network infrastructure information received from the network monitor 140 (e.g., where such network infrastructure information may be analyzed by the network-aware data center selection coordinator 150 to determine the network path information of the network paths 135 associated with the candidate data centers 110).

The network-aware data center selection coordinator 150 may select the set of servicing data centers 110 based on network path information associated with network paths 135 between the user device 130 and the candidate data centers 110, respectively, while also taking into account other information. For example, network-aware data center selection coordinator 150 may select the set of servicing data centers 110 while also taking into account one or more of geographic locations of the candidate data centers 110 relative to each other, data center loading associated with the candidate data centers 110, network status information associated with network infrastructure 120 (e.g., network congestion information, network delay information, network utilization information, and the like), data center operator preferences of an operator of the candidate data centers 110, network operator preferences of at least one network operator of at least one network 122 of network infrastructure 120, user preferences of a user of the user device 130, and the like, as well as various combinations thereof.

In one embodiment, the network-aware data center selection coordinator 150 specifies the servicing data centers 110 using a priority ordering of the servicing data centers 110. The priority ordering of the servicing data centers 110 may be based on prioritization of the servicing data centers 110 prior to the network-aware data center selection coordinator 150 determining the set of servicing data centers 110 (e.g., priorities assigned during selection of the set of candidate data centers 110, priorities assigned prior to selection of the set of candidate data centers 110, priorities assigned prior to selection of the set of candidate data centers 110 and then modified during selection of the set of candidate data centers 110, and the like). The priority ordering of the servicing data centers 110 may be determined based on prioritization of the servicing data centers 110 that is performed after the network-aware data center selection coordinator 150 determines the set of servicing data centers 110 (e.g., where prioritization may be assigned by network-aware data center selection coordinator 150 and/or a device/entity other than network-aware data center selection coordinator 150). In such embodiments, the priority ordering of the servicing data centers 110 may be based on at least one of geographic locations of the data centers 110, geographic locations of the data centers 110 relative to each other, geographic locations of the data centers 110 relative to the user device 130, data center loading associated with the data centers 110, network status information associated with network infrastructure 120 (e.g., network congestion information, network delay information, network utilization information, and the like), data center operator preferences of an operator of the data centers 110, network operator preferences of at least one network operator of at least one network 122 of network infrastructure 120, user preferences of a user of the user device 130, and the like, as well as various combinations thereof.

The network-aware data center selection coordinator 150 communicates the selected set of servicing data centers 110 to the user device 130 for use by the user device 130 in issuing service requests to the servicing data centers 110. The network-aware data center selection coordinator 150 may communicate the selected set of servicing data centers 110 to the user device 130 in any suitable manner. For example, the set of servicing data centers 110 may be communicated to the user device 130 using any suitable information to identify the servicing data centers 110 (e.g., data center identifiers of the servicing data centers 110, IP addresses of the service instances 112 of the servicing data centers 110, and the like, as well as various combinations thereof). For example, the set of servicing data centers 110 may be communicated to the user device 130 using any suitable type of signaling/messages.

The operation of system 100 in providing intelligent selection of a set of servicing data centers 110 for user device 130 may be better understood by considering an example. In this example, assume that data centers $110_1$-$110_5$ are located in Chicago, Milwaukee, Dallas, Houston, and Memphis, respectively, and that the user device 130 is located in St. Louis. The user of user device 130 would like to access the service 112 which may be provided by service instances $112_1$, $112_2$, $112_4$, or $112_5$. The user device 130 sends a service request, identifying service 112, to the network-aware data center selection coordinator 150. The network-aware data center selection coordinator 150 determines, based on the identification of service 112 in the service request, that the set of available data centers 110 for service 112 includes the data centers $110_1$, $110_2$, $110_4$, and $110_5$, as these data centers 110 host service instances $112_1$, $112_2$, $112_4$, or $112_5$ for service 112, respectively. The network-aware data center selection coordinator 150 selects a set of candidate data centers 110 from the set of available data centers 110. The network-aware data center selection coordinator 150 selects the set of candidate data centers 110 in a manner for reducing (and, where possible, minimizing) the number of network components of network infrastructure 120 common to the networks paths $135_1$, $135_2$, $135_4$, and $135_5$ from the user device 130 to the data centers $110_1$, $110_2$, $110_4$, and $110_5$, respectively. In this example, assume that (1) the network paths $135_1$ and $135_2$ from user device 130 to respective data centers $110_1$ and $110_2$ share a relatively large number of network components (e.g., since both are north of St. Louis) and, similarly, (2) the network paths $135_4$ and $135_5$ from user device 130 to respective data centers $110_4$ and $110_5$ share a relatively large number of network components (e.g., since both are south of St. Louis). By contrast, assume that (1) the network paths $135_1$ and $135_4$ or $135_5$ from user device 130 to data center $110_1$ and data centers $110_4$ or $110_5$ share a relatively small number of network components (e.g., since one is north of St. Louis and the other two are south of St. Louis) and, similarly, (2) the network paths $135_2$ and $135_4$ or $135_5$ from user device 130 to data center $110_2$ and data centers $110_4$ or $110_5$ share a relatively small number of network components (e.g., since one is north of St. Louis and the other two are south of St. Louis). Further assume that, of all possible combinations of the network paths $135_1$, $135_2$, $135_4$, and $135_5$, network paths $135_1$ and $135_4$ are most independent (i.e., have the highest orthogonality) in terms of commonality of network components of which the network paths 135 are composed. Accordingly, network-aware data center selection coordinator 150 selects data centers $110_1$ and $110_4$ as the set of candidate data centers 110 for service 112. The network-aware data center selection coordinator 150 communicates an indication of selection of data centers $110_1$ and $110_4$ as the set of candidate data centers 110 for service 112 to the user device 130. The user device 130 then initiates service requests to one or both of the respective service instances $112_1$ and $112_4$ of the candidate data centers $110_1$ and $110_4$. Thus, a failure of a network component in the network path $135_1$ from user device 130 to data center $110_1$ only impacts the access of the user to the data center $110_1$ (and, thus, the user can still access the service 112 from service instance $112_4$ of data center $110_4$) and, similarly, a failure of a network component in the network path $135_4$ from user device 130 to data center $110_4$ only impacts the access of the user to the data center $110_4$ (and, thus, the user can still access the service 112 from service instance $112_1$ of data center $110_1$). Thus, a failure of a single network component does not affect the availability or reliability of the service 112 to the user of the user device 130.

Figure 2:
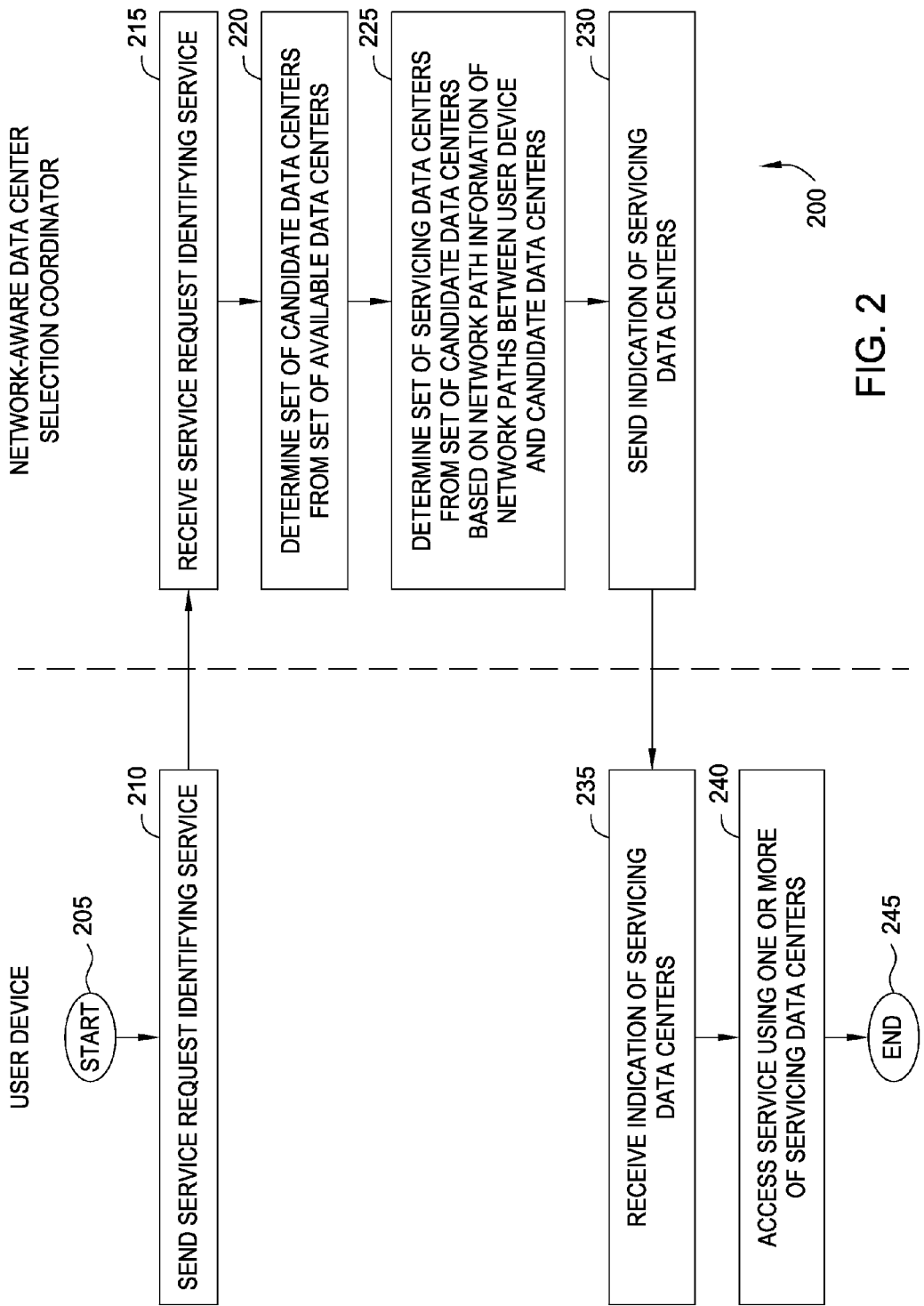
FIG. 2 depicts one embodiment of a method for intelligent selection of a set of servicing data centers for a user device for use by the user device in accessing and using a service.

The operation of system 100 in providing intelligent selection of a set of servicing data centers 110 for user device 130 is depicted and described with respect to FIG. 2.

FIG. 2 depicts one embodiment of a method for intelligent selection of a set of servicing data centers for a user device for use by the user device in accessing and using a service. As depicted in FIG. 2, a portion of the steps of method 200 are performed by a user device and a portion of the steps of method 200 are performed by a network-aware data center selection coordinator. The network-aware data center selection coordinator is configured to provide coordination functions for a plurality of available data centers supporting the service.

At step 205, method 200 begins.

At step 210, the user device sends a service request to the network-aware data center selection coordinator. At step 215, the network-aware data center selection coordinator receives the service request from the user device. The service request identifies a service to be used at the user device. The service request is a request by the user device for the network-aware data center selection coordinator to determine a set of data centers hosting a set of service instances with which the user device may communicate to access and use the requested service.

At step 220, the network-aware data center selection coordinator determines a set of candidate data centers. The set of candidate data centers includes any of the available data centers having a service instance for the service identified in the service request and, thus, capable of providing the service to the user device (which may include all of the available data centers or a subset of the available data centers). The manner in which the network-aware data center selection coordinator determines the set of candidate data centers is further described in conjunction with FIG. 1.

At step 225, the network-aware data center selection coordinator determines a set of servicing data centers. The network-aware data center selection coordinator determines the set of servicing data centers by selecting two or more of the candidate data centers as the servicing data centers. The network-aware data center selection coordinator determines the set of servicing data centers based on network path information associated with network paths between the user device and the candidate data centers and, optionally, based on other information. An exemplary method for determining the set of servicing data centers based on network path information associated with network paths between the user device and the candidate data centers is depicted and described with respect to FIG. 3. The manner in which the network-aware data center selection coordinator determines the set of servicing data centers is further described in conjunction with FIG. 1.

At step 230, the network-aware data center selection coordinator sends an indication of the servicing data centers to the user device. At step 235, the user device receives the indication of the servicing data centers from the network-aware data center selection coordinator. The set of servicing data centers may be communicated from the network-aware data center selection coordinator to the user device in any suitable manner.

At step 240, the user device accesses the service from one or more of the servicing data centers.

The user device may determine the order in which to use the servicing data centers to request the service in any suitable manner. In one embodiment, the user device may determine the order in which to use the servicing data centers from the indication of the servicing data centers provided from the network-aware data center selection coordinator to the user device (e.g., where the set of servicing data centers is provided as an ordered list from highest priority to lowest priority, where each servicing data center in the list of servicing data centers has a respective priority associated therewith such that the user device can use the priority indications to determine the order in which to use the servicing data centers, and the like, as well as various combinations thereof). In one embodiment, the user device may determine the order in which to use the servicing data centers by performing prioritization processing on the user device (e.g., based on user preference information stored at the user device, based on information received at the user device from the network (e.g., network congestion information, network delay information, network utilization information, data center loading information, preference information, and so forth), and the like, as well as various combinations thereof). In any event, the user device is able to determine an order in which to use the servicing data centers to request the service.

The user device may request the service from one or more of the servicing data centers of the set of servicing data centers serially and/or contemporaneously. In one embodiment, where the service client of the user device is a single-flow client, the user device may request the service from the service instances of the servicing data centers sequentially based on the determined order in which to use the servicing data centers (e.g., sending a service request to the highest priority servicing data center first, sending a service request to a next highest priority servicing data center if the request to the highest priority servicing data center is unsuccessful, and so forth until the service is successfully accessed). In one embodiment, where the service client of the user device is a multi-flow client, the user device may request the service from the service instances of two or more the servicing data centers contemporaneously based on the determined order in which to use the servicing data centers (e.g., sending two service requests to two highest priority servicing data centers contemporaneously, sending two service requests to a next two highest priority servicing data center if the two requests to the two highest priority servicing data centers are unsuccessful, and so forth until the service is successfully accessed). In an embodiment in which multiple service requests are sent to multiple servicing data centers contemporaneously, the user device may process the associated service responses in any suitable manner (e.g., selecting the servicing data center associated with the first successful service response received at the user device, selecting the servicing data center from among multiple servicing data centers for which associated successful service response are received based on one or more appropriate selection criteria, and the like).

The user device establishes a service session between the service client of the user device and one of the servicing data centers as described above (denoted herein as a primary service session with a primary servicing data center).

The user device, in addition to accessing the service from the primary servicing data center using the primary service session, may use the set of servicing data centers in order to access the service when the selected one of the servicing data centers is not longer reachable (e.g., due to a failure of the service instance of the primary servicing data centers, due to a network condition on the network path from the user device to the service instance of the primary servicing data centers, and the like).

In one embodiment, where the service client of the user device is a single-flow client or a multi-flow client, the user device may pre-select one of the servicing data centers (other than the primary servicing data center) as a backup servicing data center to be used when the primary servicing data center is no longer reachable. In this embodiment, when the primary servicing data center is no longer reachable, the user device initiates establishment of a backup service session between the service client of the user device and the service instance of the pre-selected one of the servicing data centers (denoted as a backup servicing data center).

In one embodiment, where the service client of the user device is a single-flow client or a multi-flow client, the user device may perform a selection process for selecting a backup servicing data center in response to a determination that the primary servicing data center is no longer reachable, where the selection process may be identical or similar to the selection process used to select the primary servicing data center or may be a different selection process which may be based on any suitable selection criteria. In this embodiment, when the primary servicing data center is no longer reachable and following completion of process for selecting the backup servicing data center, the user device initiates establishment of a backup service session between the service client of the user device and the service instance of the pre-selected one of the servicing data centers (denoted as a backup servicing data center).

In one embodiment, where the service client of the user device is a multi-flow client, the user device may (1) select a backup servicing data center (e.g., in conjunction with selection of the primary servicing data center, independent of selection of the primary servicing data center (e.g., using a selection process that is identical or similar to the selection process used to select the primary servicing data center, using a different selection process which may be based on any suitable selection criteria, and the like), and the like) and (2) initiate establishment of a backup service session between the service client of the user device and the service instance of the backup servicing data center. In this embodiment, when the primary servicing data center is no longer reachable, the user device switches from the primary session to the backup session which was pre-established prior to the primary servicing data center becoming unreachable.

The user device may use the set of servicing data centers to access the service in any other suitable manner.

At step 245, method 200 ends.

Figure 3:
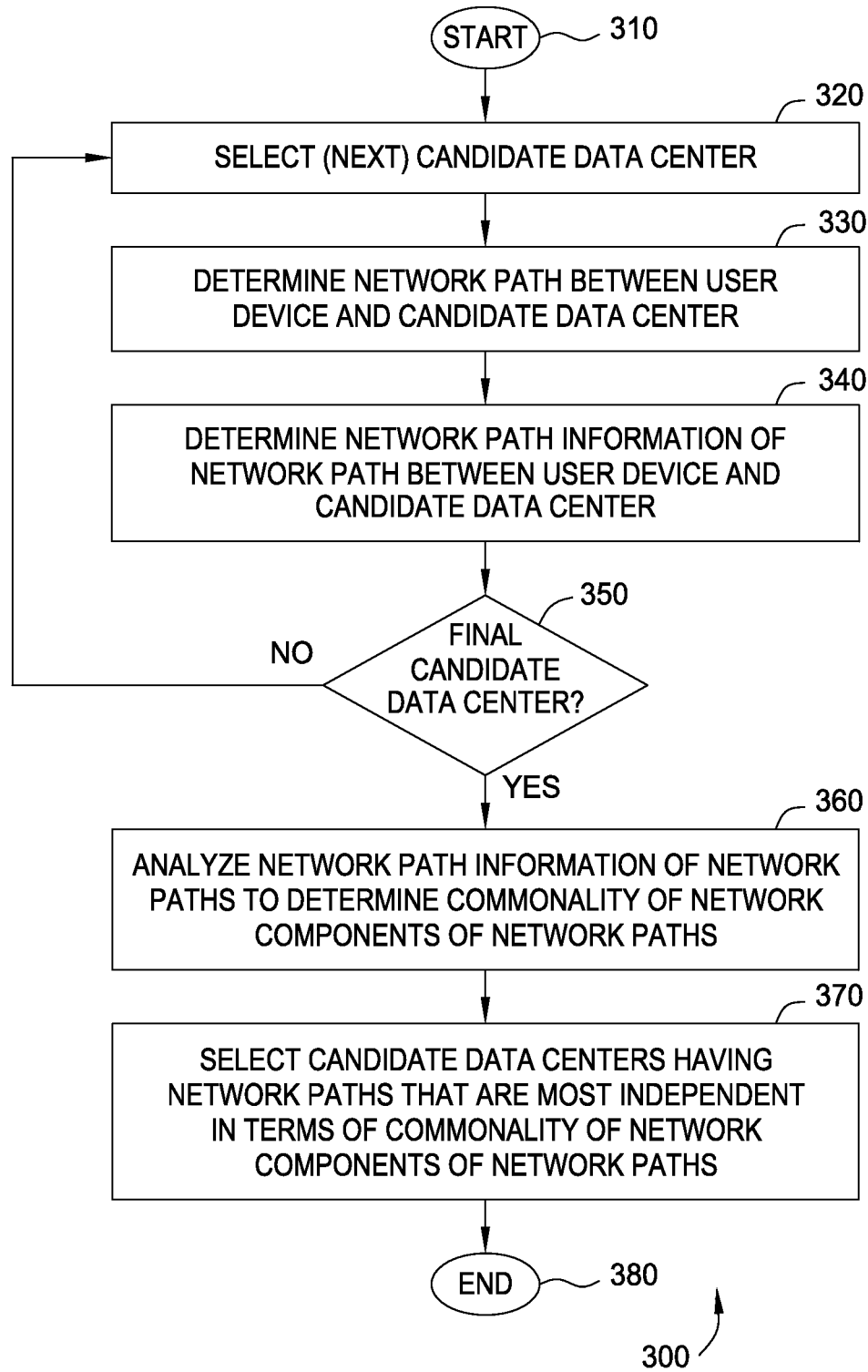
FIG. 3 depicts one embodiment of a method for determining a set of servicing data centers based on network path information associated with network paths between the user device and candidate data centers.

FIG. 3 depicts one embodiment of a method for determining a set of servicing data centers based on network path information associated with network paths between the user device and candidate data centers. In one embodiment, method 300 of FIG. 3 may be used as step 225 of FIG. 2.

At step 310, method 300 begins.

At step 320, a candidate data center is selected.

At step 330, a network path between the user device and the candidate data center is determined. The network path between the user device and the candidate data center may be determined using network infrastructure information.

At step 340, network path information of the network path between the user device and the candidate data center is determined. The network path information includes information identifying the network components of which the network path is composed (e.g., switches, routers, communication links, and the like).

At step 350, a determination is made as to whether the final candidate data center has been selected. If the final candidate data center has not been selected, method 300 returns to step 320, at which point the next candidate data center is selected. If the final candidate data center has been selected, method 300 proceeds to step 360.

At step 360, the network path information of the network paths is analyzed to determine commonality of network components of the network paths. In one embodiment, for example, for each pair of network paths, a determination is made as to the extent of commonality of network components of the two network paths in the pair of network paths (e.g., the number of network components common to both of the network paths in the pair of network paths).

At step 370, candidate data centers having associated network paths that are most independent in terms of commonality of network components of the network paths are selected as the servicing data centers for the user.

At step 380, method 300 ends.

Although omitted for purposes of clarity, it is noted that the network path information that is analyzed for purpose of selecting servicing data centers may be designed to account for changes in the physical network paths to be traversed by the packets between the user device and the servicing data centers and/or may be designed to enable changes in the physical network paths to be traversed by the packets between the user device and the servicing data centers to be ignored. In one embodiment, the network path information may include information indicative of the determined and/or likely results of execution of mechanisms designed to mitigate network conditions. In one embodiment, the network path information includes only certain types of equipment and/or links (e.g., operating at higher layers of the communication hierarchy) such that mechanisms designed to mitigate network conditions (e.g., employed at lower layers of the communication hierarchy) do not need to be accounted for in evaluation of the network path information. It will be appreciated that such mechanisms may include rerouting of traffic in a Synchronous Optical Network (SONET) optical ring, IP-based rerouting mechanisms, and any other suitable mechanisms). In at least some such embodiments, the network path information may be referred to as canonical network path information or nominal network path information.

Although primarily depicted and described herein within the context of embodiments in which a set of servicing data centers is selected for a user device, in at least some embodiments a set of servicing service instances may be selected for the user device. In some embodiments, such as those depicted and described herein, these types of selections may be considered to be equivalent since there is a one-to-one relationship between data centers and service instances of the requested service. In other embodiments, these types of selections may not be considered to be equivalent (e.g., where there is not a one-to-one relationship between data centers and service instances, where a set of servicing service instances is selected for the user device when the service instances are not associated with data centers, and the like, as well as various combinations thereof). In one embodiment, for example, a set of servicing service instances may be selected for the user device where the service instances of the service are hosted on different devices available via communication networks (e.g., different servers or other types of network devices hosting the service instances). In such embodiments, irrespective of the type of selection made/specified (e.g., selection of service instances, selection of data centers hosting service instances, selection of servers hosting service instances, selection of other types of devices hosting service instances, and the like), the user device is provide within information which enables the user device to access a service using one or more service instances of the service that have been selected for the user device.

Figure 4:
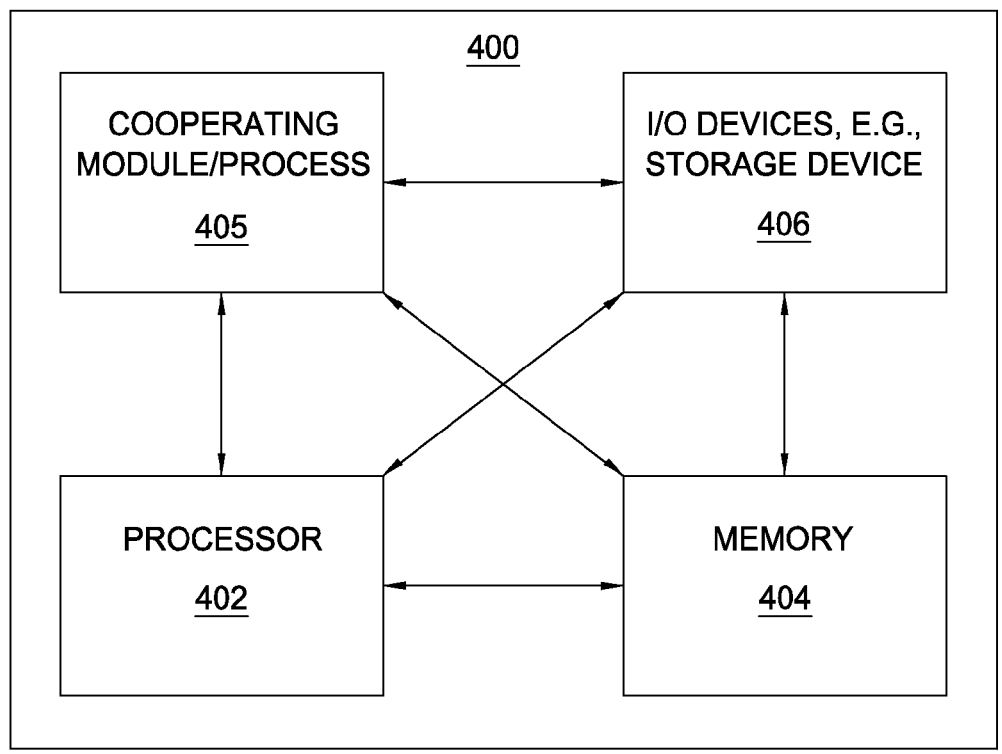
FIG. 4 depicts a high-level block diagram of a computer suitable for use in performing functions described herein.

FIG. 4 depicts a high-level block diagram of a computer suitable for use in performing functions described herein.

As depicted in FIG. 4, computer 400 includes a processor element 402 (e.g., a central processing unit (CPU) and/or other suitable processor(s)) and a memory 404 (e.g., random access memory (RAM), read only memory (ROM), and the like). The computer 400 also may include a cooperating module/process 405 and/or various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

In one embodiment, the cooperating process 405 can be loaded into memory 404 and executed by the processor 402 to implement functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of components of the data centers 110, service instances 112, network components of the network infrastructure 120, user device 130, service client 131, network monitor 140, and network-aware data center selection coordinator 150.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive, from a user device, a request for a service having a plurality of service instances hosted at a plurality of candidate data centers; and
select a set of servicing data centers for the user device, wherein the servicing data centers are selected from the plurality of candidate data centers based on network path information associated with a respective plurality of network paths between the user device the respective candidate data centers, wherein, for each of the candidate data centers, the network path information of the network path for the candidate data center comprises an indication of network components of which the network path is composed, wherein, to select the set of servicing data centers for the user device from the plurality of candidate data centers, the processor is configured to:
compare the network components of the respective network paths of the candidate data centers for determining commonality of network components of the network paths; and
select the set of servicing data centers in a manner for minimizing a number of network components common to the network paths of the servicing data centers.

2. The apparatus of claim 1, wherein the processor is configured to:
determine the candidate data centers from a plurality of available data centers hosting a plurality of services including the requested service.

3. The apparatus of claim 2, wherein, to determine the candidate data centers from the available data centers, the processor is configured to:
identify the requested service from the request for the service; and
identify, based on the requested service, ones of the available data centers hosting the service instances of the requested service.

4. The apparatus of claim 3, wherein the processor is configured to:
select, as the candidate data centers, a subset of the identified ones of the available data centers hosting the service instances of the requested service.

5. The apparatus of claim 4, wherein the processor is configured to select the subset of the identified ones of the available data centers as the candidate data centers based on at least one of geographic locations of the ones of the available data centers, geographic locations of the ones of the available data centers relative to each other, geographic locations of the ones of the available data centers relative to a geographic location of the user device, data center loading associated with the candidate data centers, network status information associated with underlying network infrastructure, a data center operator preference of an operator of the candidate data centers, a network operator preference of at least one network operator of at least one network of underlying network infrastructure, or a user preference of a user of the user device.

6. The apparatus of claim 1, wherein the processor is configured to determine the network path information for the network paths between the user device and the candidate data centers.

7. The apparatus of claim 6, wherein, to determine the network path information for the network paths between the user device and the candidate data centers, the processor is configured to:
for each of the candidate data centers, determine the respective network path between the user device the candidate data center; and
for each of the network paths associated with the respective candidate data centers, determine respective network path information associated with the network path.

8. The apparatus of claim 6, wherein the processor is configured to determine the network path information for the network paths based on network infrastructure information for a network infrastructure configured to support the network paths between the user device and the candidate data centers.

9. The apparatus of claim 1, wherein the processor is configured to select the set of servicing data centers based on a priority ordering of the candidate data centers.

10. The apparatus of claim 9, wherein the processor is configured to receive the priority ordering of the candidate data centers or determine the priority ordering of the candidate data centers.

11. The apparatus of claim 9, wherein the priority ordering of the candidate data centers is based on at least one of geographic locations of the candidate data centers, geographic locations of the candidate data centers relative to each other, geographic locations of the candidate data centers relative to a geographic location of the user device, data center loading associated with the candidate data centers, network status information associated with underlying network infrastructure, a data center operator preference of an operator of the candidate data centers, a network operator preference of at least one network operator of at least one network of underlying network infrastructure, or a user preference of a user of the user device.

12. The apparatus of claim 1, wherein the processor is configured to determine a priority ordering of the servicing data centers in the set of servicing data centers.

13. The apparatus of claim 12, wherein the priority ordering of the servicing data centers is based on at least one of geographic locations of the servicing data centers, geographic locations of the servicing data centers relative to each other, geographic locations of the servicing data centers relative to the user device, data center loading associated with the servicing data centers, network status information associated with underlying network infrastructure, a data center operator preference of an operator of the servicing data centers, a network operator preference of at least one network operator of at least one network of underlying network infrastructure, or a user preference of a user of the user device.

14. The apparatus of claim 1, wherein the processor is configured to:
propagate an indication of the set of servicing data centers toward the user device.

15. The apparatus of claim 14, wherein the indication of the set of servicing data centers includes information indicative of a priority ordering of the servicing data centers.

16. An apparatus, comprising:
a processor and a memory communicatively connected to the processor, the processor configured to:
receive, from a user device, a request for a service having a plurality of service instances hosted at a plurality of candidate data centers; and
select a set of servicing data centers for the user device, from the plurality of candidate data centers, based on network path information associated with a respective plurality of network paths between the user device the respective candidate data centers, wherein, for each of the candidate data centers, the network path information of the network path for the candidate data center comprises an indication of network components of which the network path is composed, wherein, to select the set of servicing data centers for the user device from the plurality of candidate data centers, the processor is configured to:
compare the network components of the respective network paths of the candidate data centers for determining commonality of network components of the network paths; and
select the set of servicing data centers in a manner for maximizing orthogonality of the network paths of the servicing data centers.

17. A method, comprising:
using at least one processor for:
receiving, from a user device, a request for a service having a plurality of service instances hosted at a plurality of candidate data centers; and
selecting a set of servicing data centers for the user device, from the plurality of candidate data centers, based on network path information associated with a respective plurality of network paths between the user device the respective candidate data centers, wherein, for each of the candidate data centers, the network path information of the network path for the candidate data center comprises an indication of network components of which the network path is composed, wherein selecting the set of servicing data centers for the user device comprises:
comparing the network components of the respective network paths of the candidate data centers for determining commonality of network components of the network paths; and
selecting the set of servicing data centers in a manner for minimizing a number of network components common to the network paths of the serving data centers.

18. An apparatus, comprising:
a processor and a memory communicatively connected to the processor, the processor configured to:
propagate a request for a service from a user device toward a network element; and
receive, at the user device from the network element, an indication of a plurality of servicing data centers, the servicing data centers selected by the network element from among a plurality of candidate data centers hosting a plurality of services instances of the requested service, the servicing data centers selected by the network element based on network path information associated with a plurality of network paths between the user device and the respective plurality of candidate data centers, wherein, for each of the candidate data centers, the network path information of the network path for the candidate data center comprises an indication of network components of which the network path is composed, wherein selection of the set of servicing data centers for the user device by the network element comprises comparing the network components of the respective network paths of the candidate data centers for determining commonality of network components of the network paths and selecting the set of servicing data centers in a manner for minimizing a number of network components common to the network paths of the servicing data centers.

19. A method, comprising:
using at least one processor for:
receiving, from a user device, a request for a service having a plurality of service instances hosted at a plurality of candidate data centers; and
selecting a set of servicing data centers for the user device, from the plurality of candidate data centers, based on network path information associated with a respective plurality of network paths between the user device the respective candidate data centers, wherein, for each of the candidate data centers, the network path information of the network path for the candidate data center comprises an indication of network components of which the network path is composed, wherein selecting the set of servicing data centers for the user device from the plurality of candidate data centers comprises:
comparing the network components of the respective network paths of the candidate data centers for determining commonality of network components of the network paths; and
selecting the set of servicing data centers in a manner for maximizing orthogonality of the network paths of the servicing data centers.

20. An apparatus, comprising:
a processor and a memory communicatively connected to the processor, the processor configured to:
propagate a request for a service from a user device toward a network element; and
receive, at the user device from the network element, an indication of a plurality of servicing data centers, the servicing data centers selected by the network element from among a plurality of candidate data centers hosting a plurality of services instances of the requested service, the servicing data centers selected by the network element based on network path information associated with a plurality of network paths between the user device and the respective plurality of candidate data centers, wherein, for each of the candidate data centers, the network path information of the network path for the candidate data center comprises an indication of network components of which the network path is composed, wherein selection of the set of servicing data centers for the user device by the network element comprises comparing the network components of the respective network paths of the candidate data centers for determining commonality of network components of the network paths and selecting the set of servicing data centers in a manner for maximizing orthogonality of the network paths of the servicing data centers.

* * * * *